United States Patent

[11] 3,604,041

| [72] | Inventor | Burton Ver Nooy<br>Broken Arrow, Okla. |
|---|---|---|
| [21] | Appl. No. | 778,948 |
| [22] | Filed | Nov. 26, 1968 |
| [45] | Patented | Sept. 14, 1971 |
| [73] | Assignee | T. D. Williamson, Inc.<br>Tulsa, Okla. |

[54] PIPELINE CLEANING DEVICE
10 Claims, 3 Drawing Figs.

[52] U.S. Cl. .................................................. 15/104.06,
15/104.07
[51] Int. Cl. .................................................. B08b 9/04
[50] Field of Search .......................................... 15/104.3,
104.35 N, 104.16, 104.06, 104.07, 104.18

[56] References Cited
UNITED STATES PATENTS
1,593,072  7/1926  Haydock et al. ............. 15/104.06

2,201,680  5/1940  Haynes ........................ 15/104.06
2,959,798  11/1960  Cribley ........................ 15/104.06

OTHER REFERENCES

T. D. Williamson, Inc. publication; May, 1968; copy in Gp. 359, Class 15, subclass 104.06

*Primary Examiner*—Edward L. Roberts
*Attorney*—Hyer, Eickenroht, Thompson & Turner ABSTRACT: A pipeline cleaning device comprising a body adapted to be moved forwardly through the pipeline, a plurality of springs mounted on the body, and a scraping element carried on each spring for engaging the inner wall of the pipeline in circumferentially spaced-apart relation. Each scraping element includes a base connected to the spring, a V-shaped blade upstanding from the base for tightly engaging the pipeline wall with its apex on the forward end thereof, and a relatively stiff rod extending from the base for tightly engaging at its outer end with the pipeline wall between the sides of the blade. Each of the base, blade, and rod is formed of urethane.

PATENTED SEP 14 1971

3,604,041

Burton Ver Nooy
INVENTOR.

BY Browning, Hyer, Eickerett & Thompson
ATTORNEYS

PIPELINE CLEANING DEVICE

This invention relates to a device for cleaning a pipeline or other conduit. More particularly, it relates to improvements in a device adapted to remove dirt, scale, and other extraneous matter from the inner wall of the pipeline.

Conventional devices of this type include a body adapted to be moved longitudinally through the pipeline and a series of scraper elements mounted on the body for engaging the inner wall of the pipeline as the body is so moved. One or more cups may also be mounted on the body for sealably engaging the pipeline wall so that the body may be propelled through the pipeline by means of fluid pressure behind the cups.

The scraping elements may comprise brushes with stiff bristles, blades disposed at an acute angle with respect to the axis of the body, or a combination thereof. In any case, the scraping elements are urged tightly against the pipeline wall, as by means of leaf springs, and are arranged about the body so as to scrap the entire circumference of the pipeline wall during a single pass of the device.

One problem which has been encountered with the use of brushes is the tendency for the bristles to be broken. Also, the stiff bristles as well as metal scraping blades may scratch and remove portions of the plastic with which many pipelines are now coated. In fact, the blades may even damage the inner walls of uncoated metal pipelines.

It is an object of this invention to provide a device for cleaning a pipeline or other conduit in which these and other problems are overcome.

Another object is to provide such a device which requires no parts, such as blades and the bristles of conventional brushes, which are susceptible of breakage and/or tend to damage the pipeline wall.

A further object is to provide a device of the character described in the foregoing objects which is inexpensive to manufacture and has good wear characteristics.

Yet a further object of the invention is to provide a device as above described having scraping elements of such construction as to be mounted by leaf springs or the like conventionally employed to mount brushes and/or scraper blades.

Still another object is to provide a scraping element for a device as above described which has the advantages of the conventional scraping blades, but without the disadvantages thereof.

These and other objects are accomplished, in accordance with the illustrated embodiment of the invention, by a device comprising a body having a plurality of rods mounted thereon and extending therefrom for engaging at their outer ends with the inner wall of the pipeline in circumferentially spaced-apart relation. Each rod is of such size and shape as to be relatively stiff and provide a relatively large area of engagement between its outer end and the pipeline wall. More particularly, at least the outer end of each such rod is formed of an elastomeric material, such as urethane or the like, which has a high coefficient of friction with the inner wall of the pipeline. Thus, as the device moves through the pipeline, the outer ends of the rods will frictionally engage with and disengage from the inner wall of the pipe with a relatively high frequency. This hammering against the pipeline wall causes the pipeline to vibrate, which in turn loosens particles from the inner wall thereof for removal from the pipeline.

In a preferred embodiment of the invention, the entire rod is formed of urethane or like material which provides it with the desired stiffness and strength and which may be inexpensively formed into the desired shape and size. It is also preferred that a scraping blade be mounted on the body at an acute angle with respect to the longitudinal axis of the body and forwardly of each rod so as to remove wax or other relatively soft material from the inner wall of the pipeline prior to its engagement by the rod. In this event, it is still further preferred that the blade, or at least its outer edge be formed of elastomeric material, similarly to the rod, so as to avoid damage to the pipeline wall.

More particularly, in the illustrated embodiment of the invention, each rod and blade are mounted on a single base to form a unitary scraping element, with the rod arranged intermediate the front and rear ends of the blade. In this way, there is little or no danger of the rod becoming hung up in a recess in the pipeline since the blade is long enough to span them. In this event, it is still further contemplated that the rod, blade, and base be formed of a single piece which may be mounted on the body with conventional parts, such as leaf springs, commonly used in mounting brushes. More particularly, the entire scraping element is formed of urethane which, in addition to enabling the advantages above noted, may be easily and inexpensively cast into the desired shape and size.

In the drawings, wherein like referenced characters are designated by like parts:

Figure 1:
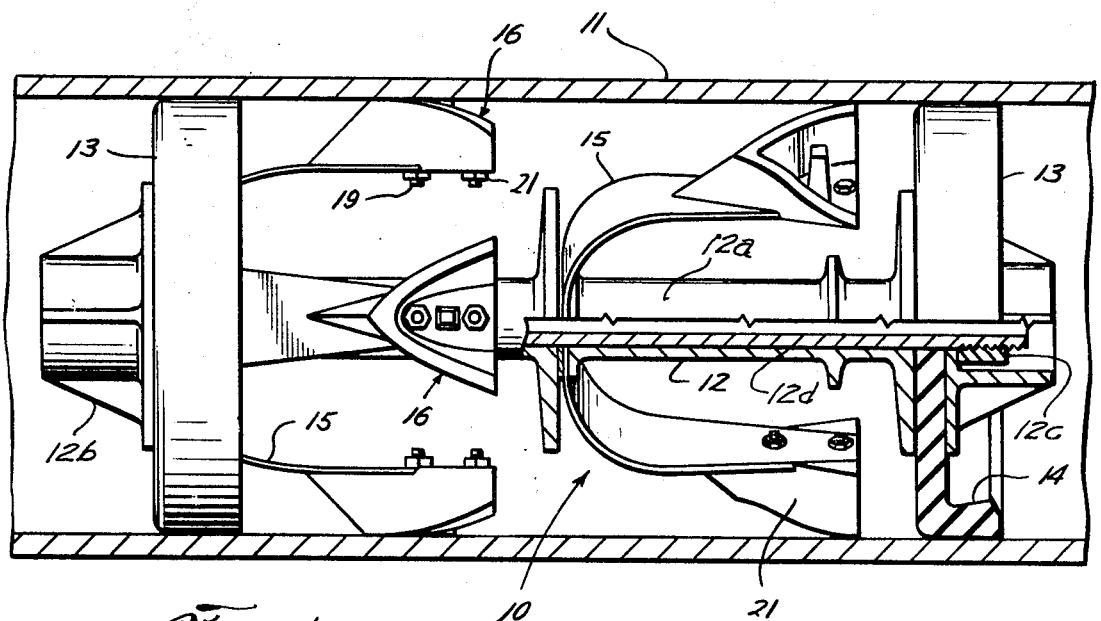
FIG. 1 is a side view, partly in section, of a device constructed in accordance with the present invention, and during movement thereof forwardly through the pipeline in a direction from right to left.

With reference now to the details of the above-described drawings, the overall device, which is indicated in its entirety by reference character 10 and shown in FIG. 1 disposed within pipeline 11 for movement forwardly therein in a direction from right to left, includes a longitudinally extending, central body 12 having a cup 13 mounted thereon adjacent each end for sliding along the inner wall of the pipeline. More particularly, and as shown by the sectioned portion of FIG. 1, each cup has a lip 14 which extends in a rearward direction and sealably engages the inner wall of the pipeline 11 so that, in a manner well known in the art, the device may be moved in a forwardly direction by means of fluid pressure on the back side of one or both of the cups 13.

Scraping elements 16 are carried on the outer ends of leaf springs 15 mounted on the body and thereby urged tightly against the inner wall of the pipeline as the device 10 moves therethrough. More particularly, in this particular embodiment of the invention, there are two longitudinally spaced sets of leaf springs 15 mounted between the front and rear cups 13, with the springs of the forward set being staggered in a circumferential sense with respect to the springs of the rearward set. Thus, as will be apparent from the description to follow, and as well known in this art, the scraping elements 16 carried on the ends of the springs 15 provide full coverage of the inner wall of the pipeline 11 during a single pass therethrough.

Each of the cups 13 and springs 15 are mounted on the body 12 in any convenient, well-known manner. Thus, as shown in FIG 1, the body may comprise an inner tubular member 12a which is threaded at each end to receive a cap 12b held in place by a nut 12c, and a pair of flanged outer tubular members 12d received over the inner member 12a intermediate the caps. The cups and springs are held between the flanges and caps in a manner obvious from FIG. 1.

Figure 2:
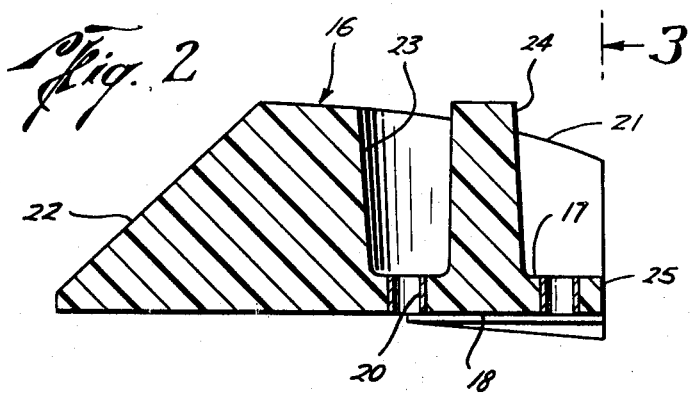
FIG. 2 is an enlarged longitudinal sectional view of one of the scraping elements of the device.
Figure 3:
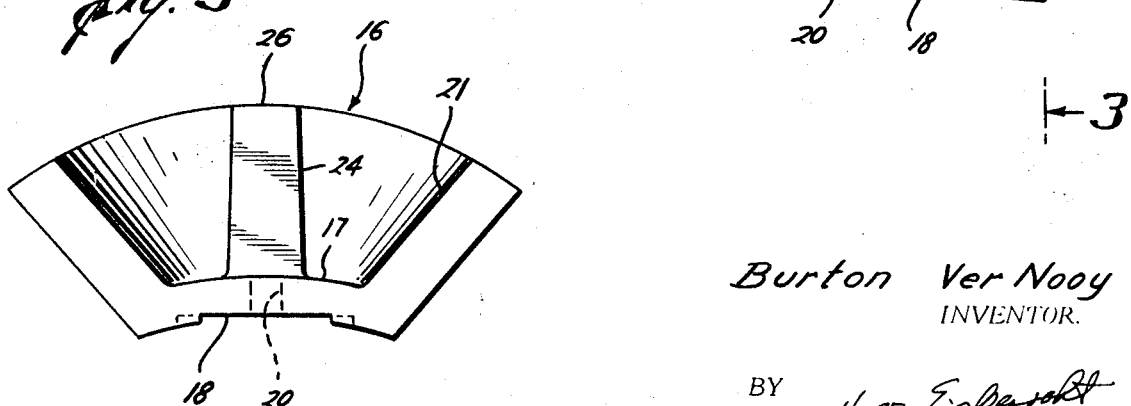
FIG. 3 is a view from the rear end of the scraping element, as seen along broken line 3—3 of FIG. 2.

With reference particularly to FIGS. 2 and 3, each scraping element 16 includes a base 17 which is triangular in plan and has inner and outer sides curved generally concentrically with respect to the longitudinal slot 18 on the inner side of the base 17 of the scraping element to receive the free end of the leaf spring 15 whereby it may be releasably connected to the spring by means of bolts 19 extended through holes 20 in the base 17 aligned with matching holes (not shown) in the leaf spring and nuts 21 received over the free ends of the bolts.

A V-shaped blade extends upwardly and outwardly from the base 17 of the scraping element 16 with its apex facing toward the forward end of the device. More particularly, and much like a plow, each side 21 of the blade flares outwardly as it extends from the apex so that its entire length is disposed generally radially with respect to the axis of the body 12 of the device, and thus perpendicularly with respect to the inner wall of the pipeline. More particularly, and as best shown in FIG. 3, the upper scraping edges of the sides of the blade are curved to the radius of the inner wall of the pipeline, and thus concentrically with respect to the axis of the body 12 when the device is disposed in the pipeline, whereby the blade will maintain surface contact with the inner wall of the pipeline throughout its length, i.e., from the front end to the rear end of each side thereof.

As can be seen from FIG. 2, the plowlike blade has a downwardly and inwardly converging point 22 at the intersection of its sidewalls 23. This provides a large mass between the front edge of the point and a wall 23 extending between the upper edges of the sides of the blade and the upper side of the base 17.

A rod 24 extends upwardly from the base 17 generally in alignment with the apex of the blade and intermediate the front and rear ends of the blade. More particularly, the rod 24 is disposed generally equidistant the vertical wall 23, ad the rear end 25 of the base 17, and thus intermediate bolt holes 20. As best shown in FIGS. 2 and 3, this rod 24 is of the same radial height with respect to the base 17 as are the opposite sides 21 of the blade, and its outer end 26 of the rod is curved to approximately the radius of the inner wall of the pipeline so as to provide a large area of engagement between the rod and pipeline wall. Obviously, however, even if this outer end of the rod is not at first absolutely concentric with the pipeline wall, normal wear will make it so.

As previously described, the rod 24 is relatively stiff, and formed of an elastomeric material having a high coefficient of friction with respect to the inner wall of the pipeline. In this manner, and as also previously described, the outer end of the rod is caused to frictionally engage with and disengage from the pipeline wall, as the device 10 moves therethrough, with relatively high frequency. Thus, the rod is caused to hammer against the inner wall of the pipeline so as to vibrate a section of the pipeline in and around the device 10 and thereby release particles of different types from the inner wall of the pipeline.

I have found a rod formed of urethane to be particularly well suited for these as well as other purposes of the present invention. Thus, urethane is a relatively stiff material, and in fact is stiffer than rubber for the same hardness, and has a high coefficient of friction relative to the wall of the pipeline. Still further, urethane has good wear characteristics, which are necessary in view of the fact that it is moved longitudinally over the inner wall of the pipeline, and is sufficiently strong to prevent it from being easily torn loose from the end of the leaf spring 15. Still further, urethane may be cast, rather than molded, as is necessary in the case of rubber, which of course reduces the time and expense of forming the rod.

The stiffness of the rod is, of course, determined by its cross-sectional area dna shape relative to the length of the rod. Thus, if a more flexible material is used, it may be found necessary to increase the cross section of the rod. In like manner, if a material having a lower coefficient of friction with respect to the pipeline wall is used, it may be necessary to provide the outer end 26 of the rod with a larger area.

Each blade is also formed of an elastomeric material in order to reduce the tendency to damage the inner wall of the pipeline. More particularly, the blade is also formed of urethane which not only enables it to be cast as a unitary piece with a rod and base, but also has good strength and wear characteristics. Thus, as best illustrated in FIG. 2, the entire scraping element is cast of a unitary piece of urethane in which the holes 20 may be formed to receive the bolts 19.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A device for cleaning a pipeline or other conduit, comprising a body adapted to be moved forwardly through the pipeline, and a plurality of rods mounted on the body and extending outwardly therefrom in circumferentially spaced-apart relation for tightly engaging at their outer ends with the inner wall of the pipeline when the body is disposed therein, each rod being relatively stiff and having a relatively large area on its outer end which is formed of urethane or like material having a high coefficient of friction with respect to the pipeline wall so that said outer end is caused to frictionally engage with and disengage from said wall with relatively high frequency as said body is so moved.

2. A device for cleaning a pipeline or other conduit, comprising a body adapted to be moved forwardly through the pipeline, and a plurality of rods mounted on the body and extending outwardly therefrom in circumferentially spaced-apart relation for tightly engaging at their outer ends with the inner wall of the pipeline when the body is disposed therein, each rod being formed of urethane or like material which is relatively stiff and has a high coefficient of friction with respect to the pipeline wall, and the cross-sectional area and shape of each rod being so related to its length and the area of its outer end being of such size as to cause said outer end to frictionally engage with and disengage from the pipeline wall with relatively high frequency as said body is so moved.

3. A device for cleaning a pipeline or other conduit, comprising a body adapted to be moved forwardly through the pipeline, a plurality of scraping blades mounted on the body for engaging the inner wall of the pipeline in circumferentially spaced-apart relation, each blade extending at an acute angle with respect to the longitudinal axis of the body, and a plurality of relatively stiff, elastomeric rods each mounted on the body and extending outwardly therefrom to tightly engage at their outer ends with the pipeline wall and longitudinally intermediate the front and rear ends of a blade.

4. The device of claim 3, wherein each rod is laterally intermediate the sides of the blade.

5. A device for cleaning a pipeline or other conduit, comprising a body adapted to be moved forwardly through the pipeline, and a plurality of scraping elements mounted on the body in circumferentially spaced-apart relation, each scraping element including a base, a blade upstanding from the base for engaging the pipeline wall at an acute angle with respect to the axis of the body, and a relatively stiff rod extending outwardly from the base to tightly engage said wall and longitudinally intermediate the front and rear ends of the blade, the outer end of said rod being formed of an elastomeric material having a high coefficient of friction with respect to said wall.

6. The device of claim 5, wherein each rod is laterally intermediate the sides of the blade.

7. The device of claim 5, wherein the entire rod is formed of an elastomeric material.

8. A device for cleaning a pipeline or other conduit, comprising a body adapted to be moved forwardly through the pipeline, a plurality of springs mounted on the body, and a scraping element carried on each spring for engaging the inner wall of the pipeline in circumferentially spaced-apart relation, each scraping element including a blade for tightly engaging the pipeline wall at an acute angle with respect to the longitudinal axis of the body, and a relatively stiff rod for tightly engaging said wall and longitudinally intermediate the front and rear ends of said blade, the outer end of said rod being formed of a material having a high coefficient of friction with respect to said inner wall of pipeline.

9. The device of claim 8, wherein each rod is laterally intermediate the sides of the blade.

10. A scraping element for a device for cleaning a pipeline or other conduit, comprising a base having a V-shaped blade upstanding from the base, and a rod extending from the base within the sides of the blade, each of the blade and rod being of substantially the same height relative to the base, and each of the base, blade, and rod being formed of urethane or like material which is relatively stiff and has a high coefficient of friction relative to the inner wall of the pipeline.